(12) United States Patent
Hudson

(10) Patent No.: US 7,102,532 B2
(45) Date of Patent: Sep. 5, 2006

(54) SUBSEA COMMUNICATION

(75) Inventor: Steven Martin Hudson, Sturminster Newton (GB)

(73) Assignee: Expro North Sea Limited, Reading (GB)

( * ) Notice: Subject to any disclaimer, the term of this patent is extended or adjusted under 35 U.S.C. 154(b) by 465 days.

(21) Appl. No.: 10/250,588

(22) PCT Filed: Dec. 20, 2001

(86) PCT No.: PCT/GB01/05670

§ 371 (c)(1),
(2), (4) Date: Jul. 2, 2003

(87) PCT Pub. No.: WO02/054635

PCT Pub. Date: Jul. 11, 2002

(65) Prior Publication Data

US 2004/0051649 A1    Mar. 18, 2004

(30) Foreign Application Priority Data

Jan. 3, 2001  (GB) ................. 0100103.1

(51) Int. Cl.
*G01V 3/00* (2006.01)
*G01S 13/00* (2006.01)
*H04B 13/02* (2006.01)
*H04B 11/00* (2006.01)
*G05D 1/00* (2006.01)

(52) U.S. Cl. ................ 340/854.6; 340/852; 340/853.1; 340/853.3; 342/22; 367/131; 701/21

(58) Field of Classification Search ............. 340/852, 340/853.1, 854.3, 855.1, 856.4, 853.14, 854.6; 439/680; 342/22; 367/131; 701/21
See application file for complete search history.

(56) References Cited

U.S. PATENT DOCUMENTS

| 3,641,427 | A | * | 2/1972 | Pittman et al. ............. 324/365 |
| 4,181,014 | A | * | 1/1980 | Zuvela et al. ............ 340/853.5 |
| 4,516,069 | A | * | 5/1985 | Schmanski ................. 324/71.1 |
| 5,587,707 | A | * | 12/1996 | Dickie et al. .......... 340/870.09 |

OTHER PUBLICATIONS

International Search Report, mailed Feb. 22, 2002.

* cited by examiner

*Primary Examiner*—Jeffery Hofsass
*Assistant Examiner*—Sisay Yacob
(74) *Attorney, Agent, or Firm*—Alston & Bird LLP

(57) ABSTRACT

Methods of subsea communication in which a cathodic protection anode is used as a transmitting antenna. The signals are received at a second location by two electrodes which are spaced apart by different distances from the transmitting antenna.

22 Claims, 1 Drawing Sheet

SUBSEA COMMUNICATION

BACKGROUND OF THE INVENTION

1. Field of the Inventon

This invention relates to subsea communication.

2. Description of Related Art

There are a wide variety of different circumstances in which it is desirable to be able to communicate between bodies in a subsea environment. The term subsea is used in this application as this is conventional terminology, however, it should be appreciated that the term subsea encompasses any underwater situation.

A specific example of where subsea communication is important is in the operation of tetherless Autonomous Underwater Vehicles (AUVs) and tethered remotely operated vehicles (ROVs). Such vehicles need to be controlled and the data which they gather needs to be extracted. It is preferable if this control and extraction of data can be done on a regular basis (perhaps in real time) and without the need for a physical connection between the vehicle and, say, a surface vessel and without the need to bring the vehicle back to the surface vessel.

Various means of communication between AUV's and other locations have been investigated. One possibility is acoustic transmission but this suffers from difficulties because of noise generated by the fans which drive the AUV.

BRIEF SUMMARY OF THE INVENTION

It is an object of this invention to provide a means for subsea communication which amongst other things, may be suitable for use with AUV's.

According to a first aspect of the present invention there is provided a method of subsea communication comprising the steps of:

transmitting signals from a first location by causing subsea antenna means to emit electromagnetic radiation, and receiving the signals at a second location via two electrodes disposed at different distances from the antenna means.

According to a second aspect of the present invention there is provided a subsea communication system comprising:

transmitting means disposed at a first location and arranged to cause subsea antenna means to emit electromagnetic signals, two electrodes disposed at different distances from the antenna means, and receiving means disposed at a second location and arranged to receive the signals via the electrodes.

According to a third aspect of the present invention there is provided subsea communication apparatus for use in a subsea communication system or method, the apparatus comprising transmitting means locatable at a first location for causing subsea antenna means to emit electromagnetic signals, and receiving means locatable at a second location and arranged to receive signals via two electrodes disposed at different distances from the antenna means.

According to a fourth aspect of the present invention there is provided subsea communication apparatus for use in a subsea communication system or method, the apparatus comprising at least one subsea antenna means, transmitting means locatable at a first location for causing the subsea antenna means to emit electromagnetic signals, two electrodes locatable at different distances from the antenna means and receiving means locatable at a second location and arranged to receive signals via the electrodes.

The communication method, system and apparatus can function because the electric field seen at one of the electrodes is different from that seen at the other electrode due to the reduction in signal strength as distance from the antenna is increased. Thus a signal is not measured relative to some earth but by virtue of a spatial change in field strength. The maximum signal will be measured in a direction perpendicular to the field lines. Thus it is preferable if the two electrodes are arranged along a vector pointing towards the signal source or the expected direction of the signal source.

The communication method, system and apparatus are particularly applicable in relation to pipeline systems, such as those used in the oil and gas industry. In such cases the first or second location might be part of a pipeline system and the respective other location might be on a surface vessel, a surface structure or a subsea vehicle. Similarly first or second location might be on a subsea vehicle and the respective other location might be on a surface vessel or a surface structure. Communication in accordance with this application can be carried out without the need for connecting cables. This, amongst other things, facilitates tetherless operation of subsea vehicles.

In a particular preferred implementation the first location is a remote wellhead. A remote wellhead is one which is not connected by a seabed (or other) flowline to a larger pipeline system. Such a well may be a monitoring well or a formerly producing well that has been cut off.

The antenna means may comprise a cathodic protection anode provided on metallic structure.

This communication method, system and apparatus may be used to send data gathered from sensors or other components from the first to the second location. In some embodiments the data might include measurements taken at a pipeline system and transmitted from the pipeline system. In such a case, the antenna means may comprise an anode. In other embodiments the data might include information collected by an Autonomous Underwater Vehicle (AUV), for example, the AUV might conduct a survey of a pipeline system and upload the survey data to a surface structure or vessel.

In yet further embodiments where signals are transmitted from a pipeline system, the pipeline system itself may be used as a signal channel to carry data to be transmitted from a remote location to the region of the antenna means for emission. In one example, a AUV may be local to a pipeline system and it may be desired to transmit data to the AUV from a platform in the pipeline system. In such a case, the data can be sent along the pipeline from the platform to the vicinity of the AUV and then transmitted from antenna means to the AUV. This type of communication may be accomplished by receiving and retransmitting the data in the region of the antenna or simply by causing or allowing the antenna to radiate the signal received along the pipeline.

At least one of the electrodes may comprise a portion of a structure, vessel or vehicle which contacts with a body of water through which signals are to be sent. Said portion may be a standard part of the structure, vessel or vehicle or may be specially provided. The other electrode may be provided towards the distal end of an elongate conductor, for example a shielded cable.

Preferably the characteristics of the radiation, in particular the frequency, and the difference in distance of the electrodes from the antenna means are chosen so that the drop in signal between the electrodes caused by the fall off of the signal is significantly greater than differences in signal strength caused by phase difference. In practice this will be easily accomplished because the frequencies of electric signals which propagate well through water correspond to wavelengths which are very large compared with any practical electrode spacing.

BRIEF DESCRIPTION OF THE SEVERAL VIEWS OF THE DRAWING

An embodiment of the present invention will now be described by way of example only, with reference to the accompanying drawing which schematically shows a surface vessel, an AUV and part of a pipeline system in which the present invention is embodied.

DETAILED DESCRIPTION OF THE INVENTION

Figure 1:
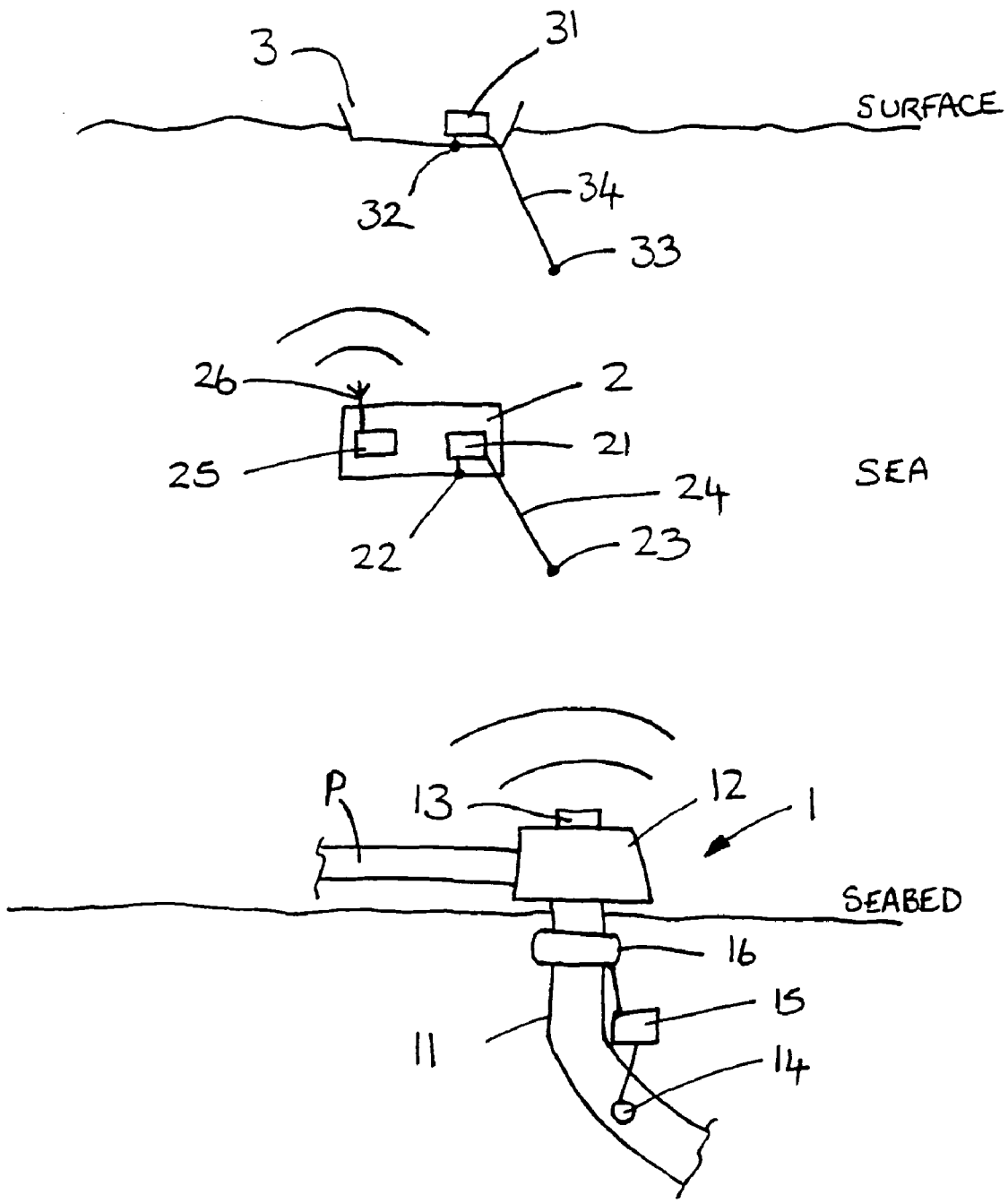

The drawing shows a pipeline system 1, provided at the sea bed, an Autonomous Underwater Vehicle (AUV) 2 located in the sea surrounding the pipeline system 1 and a surface vessel 3.

The pipeline system 1 comprises a production string 11 which terminates at a wellhead 12. The wellhead 12 is provided with a cathodic protection anode 13 which is in electrical contact with the metallic structure of the production string 11 via the wellhead 12. Sensors 14 for measuring parameters such as temperature and pressure are provided in the production string 11 and an output of the sensors 14 is connected to an electronics module 15. In turn, the electronics module 15 is connected to a toroidal coil 16 provided around the production string 11.

The electronics module 15 and toroidal coil 16 are arranged so that data received from the sensors 14 can be encoded onto signals which are induced onto the production string 11 by a transformer like interaction. In essence, the metallic structure of the pipeline system 1 and an earth return form a single turn winding in a transformer onto which signals can be induced. However, the mechanism for injection of signals onto the production string 11 is not of great significance to the present application and so will not be described in any further detail.

The anode 13 is in electrical contact with the production string 11, via the wellhead 12 and is uninsulated. Therefore, the anode 13 will act as an antenna means emitting radiation into the surrounding sea which corresponds to the signals injected onto the production string 11.

The AUV 2 comprises receiving means 21 which is connected to a pair of spaced electrodes 22, 23. The first of these electrodes 21 is provided on the surface of the AUV 2 and the second electrode 23 is provided at the end of a shielded cable 24.

The AUV 2 also comprises transmitting means 25 with an associated transmitting attena 26. Meanwhile the surface vessel 3 comprises receiving means 31 which is connected to a pair of spaced electrodes 32, 33 which are similarly or identically arranged to those of the AUV 2. Thus, a first of the electrodes 32 is provided on the surface of the surface vessel 3 and the second of the electrodes 33 is provided at the end of a shielded cable 34.

In general terms, each of the receiving means 21, 31 and its associated electrodes 22, 23; 32, 33 is arranged to receive signals emitted into the water by a respective subsea antenna be this the anode 13 of the pipeline system 1 or the transmitting antenna of 26 of the AUV 2.

In both cases, the respective pairs of spaced electrodes 22, 23; 32, 33 are at different distances from the respective transmitting antenna 13, 26 and are able to pick up signals because the electric field seen at the respective first electrode 22, 32 will be different from that seen at the respective second electrode 23, 33.

In this embodiment, data concerning the parameters measured by the sensors 14 may be transmitted by the anode 13 and received by the AUV 2 and/or by the surface vessel 3.

Similarly, information gathered by the AUV 2, either via its respective receiving means 21 or by other equipment located on the AUV 2, may be transmitted to the surface vessel 3.

In one particular mode of operation, the AUV 2 is used to perform a survey of a pipeline system, for example using sonar scanning equipment, and the results of this survey may be transmitted from the AUV 2 to the surface vessel 3.

Although not shown in the drawings, the surface vessel 3 may also comprise suitable transmitting means for transmitting signals which can be received at the AUV2 via its respective electrodes 22, 23 and receiving means 21. This information might, for example, include instructions for controlling the path and/or operation of the AUV2.

In the present embodiment, electrical signals having frequencies in the order of 100 Hz or a few hundred Hz are used and received via the electrodes. In such circumstances it is expected that the system will have a range of at least the order of low hundreds of meters but a range in the order of a few Km is not out of the question. It should also be noted however, that different frequencies of radiation may be used.

The spacing between the first and second electrodes 32, 33 in the case of a surface vessel 3 might be say 20 to 30 meters whereas when used on an AUV 2 the spacing might be 1 or 2 meters. In general a greater spacing will improve the ability to pick up signals but practicalities limit the spacing.

In the embodiment described above, signals are transmitted from the anode 13 by way of direct transmission from the adjacent pipeline system 1. However, in alternatives, a signal may be output via the anode 13 by transmitting across inductance means provided in series between the anode 13 and the adjacent portion of the pipeline system 1.

Although the embodiment described above relates to the use of the invention in a specific way in relation to pipeline systems, AUVs and surface vessels, the communication method, system, and apparatus are not limited to use in such a way.

For example, although the wellhead 12 described above is connected to a pipeline P the present system still functions with, and in fact is particularly attractive for use with remote wellheads which are not connected to a larger pipeline system. Such wells may be monitoring wells or wells which are temporarily or permanently out of use and cut off. Thus, in an alternative embodiment, the well head 12 is a remote wellhead, the remainder of the system being substantially the same as that described above In an extension of the present embodiment the first and second electrodes 22, 23, 32, 33 may be replaced with a 3 axis detection system comprising three orthogonally arranged pairs of spaced electrodes. This can allow the direction from which the signal is being transmitted to be determined as this corresponds to the direction of maximum signal strength. If this idea is further extended so that multiple signals from different origins are received and their directions determined, it is possible using triagulation to determine the position of the receiving vessel, structure or vehicle relative to the transmitting origins.

The invention claimed is:

1. A method of remote wellhead subsea communication comprising the steps of:

transmitting signals from a remote wellhead by causing a subsea antenna comprising a cathodic protection anode provided on the remote wellhead to emit electromagnetic signals; and receiving the signals at a location away from the remote wellhead via two electrodes disposed at different distances from the antenna.

2. A method according to claim 1 in which the location away from the wellhead is on one of a surface vessel and a subsea vehicle.

3. A method of subsea vehicle communication comprising the steps of:
   transmitting signals from a pipe line system by causing a subsea antenna comprising a cathodic protection anode provided on the pipeline to emit electromagnetic signals; and
   receiving the signals at a subsea vehicle via two electrodes disposed at different distances from the antenna.

4. A method according to claim 3 including the further step of using the pipeline system as a signal channel to carry data to be transmitted from a remote location to a region of the antenna for emission.

5. A method according to claim 4 including the step of receiving and re-transmitting the data in the region of the antenna.

6. A method according to claim 4 including the step of allowing the antenna to radiate the signal received along the pipeline.

7. A method according to claim 1 comprising the further step of arranging the two electrodes along a vector pointing towards one of the signal source and an expected position of the signal source.

8. A method according to claim 3 in which one of the electrodes comprises a portion of one of a vessel and a vehicle which contacts with a body of water through which signals are to be sent and the other electrode is provided towards the distal end of an elongate conductor.

9. A method according to claim 1 in which the signals are received via a 3 axis detection system comprising three orthogonally arranged pairs of spaced electrodes.

10. A remote wellhead subsea communication system comprising:
    a transmitter disposed at a remote wellhead and arranged to cause a subsea antenna comprising a cathode protection anode provided on the remote wellhead to emit electromagnetic signals;
    two electrodes disposed at different distances from the antenna; and
    a receiver disposed at a location away from the wellhead and arranged to receive the signals via the electrodes.

11. A subsea vehicle communication system comprising:
    a transmitter disposed on a pipeline and arranged to cause a subsea antenna comprising a cathodic protection anode provided on the pipeline to emit electromagnetic signals;
    two electrodes disposed at different distances from the antenna; and
    a receiver disposed on a subsea vehicle and arranged to receive the signals via the electrodes.

12. A method of remote wellhead subsea communication comprising the steps of:
    transmitting signals from a remote wellhead by causing subsea antenna means comprising a cathodic protection anode provided on the remote wellhead to emit electromagnetic signals; and
    receiving the signals at a location away from the remote wellhead via two electrodes disposed at different distances from the antenna means.

13. A method of subsea vehicle communication comprising the steps of:
    transmitting signals from a pipe line system by causing subsea antenna means comprising a cathodic protection anode provided on the pipeline to emit electromagnetic signals; and
    receiving the signals at a subsea vehicle via two electrodes disposed at different distances from the antenna means.

14. A remote wellhead subsea communication system comprising:
    transmitting means disposed at a remote wellhead and arranged to cause subsea antenna means comprising a cathode protection anode provided on the remote wellhead to emit electromagnetic signals;
    two electrodes disposed at different distances from the antenna means; and
    receiving means disposed at a location away from the wellhead and arranged to receive the signals via the electrodes.

15. A subsea vehicle communication system comprising:
    transmitting means disposed on a pipeline and arranged to cause subsea antenna means comprising a cathodic protection anode provided on the pipeline to emit electromagnetic signals;
    two electrodes disposed at different distances from the antenna means; and
    receiving means disposed on a subsea vehicle and arranged to receive the signals via the electrodes.

16. A method according to claim 3 comprising the further step of arranging the two electrodes along a vector pointing towards one of the signal source and the expected position of the signal source.

17. A method according to claim 1 in which one of the electrodes comprises a portion of one of a vessel and a vehicle which contacts with a body of water through which signals are to be sent and the other electrode is provided towards the distal end of an elongate conductor.

18. A method according to claim 3 in which the signals are received via a 3 axis detection system comprising three orthogonally arranged pairs of spaced electrodes.

19. A method of remote wellhead subsea communication comprising the steps of:
    transmitting signals through water from a remote wellhead by causing a subsea antenna comprising a cathodic protection anode provided on the remote wellhead to emit electromagnetic signals;
    arranging two electrodes at selected positions such that the two electrodes are at different distances from the antenna; and
    receiving the signals at a location away from the remote wellhead via the two electrodes.

20. A method according to claim 19 comprising the step of selecting the positions of the two electrodes in dependence on an expected position of the signal source.

21. A method according to claim 7 comprising the step of varying the position of at least one of the two electrodes in dependence on one of: the position of the signal source, and an expected position of the signal source.

22. A method according to claim 16 comprising the step of varying the position of at least one of the two electrodes in dependence on one of: the position of the signal source, and an expected position of the signal source.

* * * * *